(12) United States Patent
Sekii

(10) Patent No.: US 10,495,871 B2
(45) Date of Patent: Dec. 3, 2019

(54) ROTARY DRIVE APPARATUS

(71) Applicant: Nidec Corporation, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 99 days.

(21) Appl. No.: 15/957,987

(22) Filed: Apr. 20, 2018

(65) Prior Publication Data

US 2018/0348505 A1 Dec. 6, 2018

(30) Foreign Application Priority Data

May 30, 2017 (JP) ................. 2017-107203

(51) Int. Cl.
| | | |
|---|---|---|
| *G02B 26/08* | (2006.01) | |
| *H02K 7/02* | (2006.01) | |
| *H02K 7/08* | (2006.01) | |
| *H02K 7/00* | (2006.01) | |
| *G02B 26/10* | (2006.01) | |
| *H02K 1/27* | (2006.01) | |

(52) U.S. Cl.
CPC ..... *G02B 26/0816* (2013.01); *G02B 26/0875* (2013.01); *H02K 7/003* (2013.01); *H02K 7/02* (2013.01); *H02K 7/085* (2013.01); *G02B 26/105* (2013.01); *H02K 1/2793* (2013.01)

(58) Field of Classification Search
CPC ............ G02B 26/0816; G02B 26/0875; G02B 26/105; H02K 7/02; H02K 7/085; H02K 7/003; H02K 1/2793; H02K 5/1675; H02K 7/14; H02K 21/22
USPC ....................................... 359/221.3
See application file for complete search history.

(56) References Cited

U.S. PATENT DOCUMENTS 5,274,491 A * 12/1993 Collins, Jr. ............ G02B 26/10
    235/455
2016/0359391 A1 12/2016 Sekii et al.

FOREIGN PATENT DOCUMENTS

JP          5-79525 U    10/1993

* cited by examiner

*Primary Examiner* — Euncha P Cherry
(74) *Attorney, Agent, or Firm* — Keating & Bennett, LLP

(57) ABSTRACT

This rotary drive apparatus is arranged to cause incoming light coming from a light source to be emitted to an outside while changing the direction of the incoming light, and includes a motor including a hollow shaft arranged to extend along a central axis extending in a vertical direction, the hollow shaft including a through hole arranged to pass therethrough in an axial direction. The through hole defines a light path along which the incoming light travels. A light-transmitting member is arranged to be in contact with an inner circumferential surface of the hollow shaft over the entire circumferential extent of the inner circumferential surface of the hollow shaft, over at least a portion of the vertical extent of the through hole.

15 Claims, 11 Drawing Sheets

ROTARY DRIVE APPARATUS

CROSS REFERENCE TO RELATED APPLICATIONS

This application claims the benefit of priority to Japanese Patent Application No. 2017-107203 filed on May 30, 2017. The entire contents of this application are hereby incorporated herein by reference.

BACKGROUND OF THE INVENTION

1. Field of the Invention

The present invention relates to a rotary drive apparatus.

2. Description of the Related Art

A known scanner apparatus used for position recognition in a head-mounted display (HMD) or the like typically has installed therein a flywheel arranged to emit light coming from a light source to a surrounding space while changing the direction of the light so that the light will impinge on a target object, and a motor arranged to rotatably support the flywheel. Such an apparatus arranged to support a flywheel and an optical component to change the direction of light coming from a light source is described in, for example, JP-A 2016-226227.

SUMMARY OF THE INVENTION

It is conceivable to unify a light source and a motor described in JP-A 2016-226227, which has a flywheel installed in an upper portion thereof. To achieve this, it is conceivable to fix the light source to a base portion of the motor, and use a hollow shaft as a shaft of the motor so that incoming light coming from the light source can pass through a through hole of the hollow shaft, and be emitted to an outside through the flywheel, which is supported by a rotating portion of the motor. The adoption of this structure will make it possible to cause light to be emitted from the flywheel in all directions to a surrounding space without the need for a separate dedicated member to fix the light source.

However, the hollow shaft of the motor may be deformed when being finished in a manufacturing process, such as when an outer circumferential surface of the hollow shaft is ground, and therefore cannot be easily worked with high accuracy. Thus, a tilt or a displacement of an optical component installed in the flywheel, which is supported by a rotor hub portion arranged around the shaft, may occur. If this happens, light being emitted to the outside may slant or deviate.

The present invention has been conceived to provide a rotary drive apparatus arranged to cause light emitted from a light source to be emitted to an outside while changing the direction of the light, the rotary drive apparatus including a hollow shaft having an outer circumferential surface that can be finished with high accuracy.

A rotary drive apparatus according to a preferred embodiment of the present invention is arranged to cause incoming light coming from a light source to be emitted to an outside while changing a direction of the incoming light, and includes a motor including a hollow shaft arranged to extend along a central axis extending in a vertical direction, the hollow shaft including a through hole arranged to pass therethrough in an axial direction; a flywheel including at least one optical component arranged to reflect the incoming light or allow the incoming light to pass therethrough; and a laser module including the light source and a light-transmitting member. The through hole defines a light path along which the incoming light travels. The light-transmitting member is arranged to be in contact with an inner circumferential surface of the hollow shaft over an entire circumferential extent of the inner circumferential surface of the hollow shaft, over at least a portion of a vertical extent of the through hole.

According to the above preferred embodiment of the present invention, the light-transmitting member is arranged to be in contact with the inner circumferential surface of the hollow shaft of the motor, which is arranged to support the flywheel, which is arranged to emit the incoming light to the outside while changing the direction of the incoming light, over the entire circumference extent of the inner circumferential surface of the hollow shaft. This leads to improved accuracy in finishing an outer circumferential surface of the hollow shaft in a process of manufacturing the rotary drive apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor, which will be described below, is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a flywheel is arranged with respect to the motor is defined as an upper side. The shape of each member or portion and relative positions of different members or portions will be described based on the above assumptions. It should be noted, however, that the above definitions of the vertical direction and the upper side are not meant to restrict in any way the orientation of a rotary drive apparatus according to any preferred embodiment of the present invention when in use. Also note that the term "parallel" as used herein includes both "parallel" and "substantially parallel". Also note that the term "perpendicular" as used herein includes both "perpendicular" and "substantially perpendicular".

Figure 1:
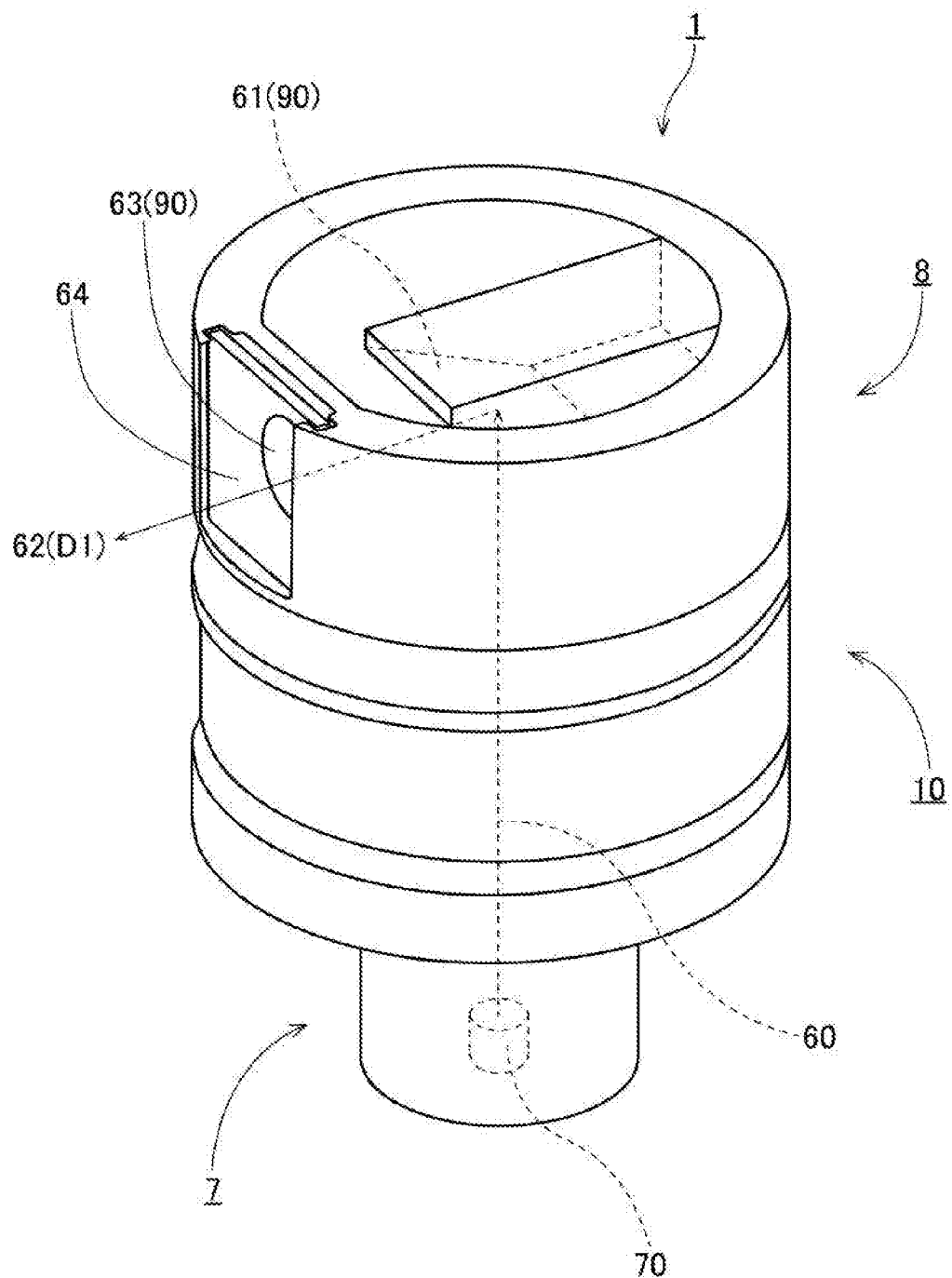
FIG. 1 is a perspective view of a rotary drive apparatus according to a first preferred embodiment of the present invention.

FIG. 1 is a perspective view of a rotary drive apparatus 1 according to a first preferred embodiment of the present invention. The rotary drive apparatus 1 is an apparatus arranged to cause incoming light 60 coming from a light source 70 to be emitted to an outside of the rotary drive apparatus 1 while changing the direction of the incoming light 60. The light source 70, which is installed in a laser module 7, is arranged in a lower portion of the rotary drive apparatus 1. The incoming light 60, which travels upward along a central axis 9, which will be described below, extending in a vertical direction of a motor 10, is emitted from the light source 70.

Referring to FIG. 1, the rotary drive apparatus 1 includes the motor 10, the laser module 7, and a flywheel 8.

Figure 2:
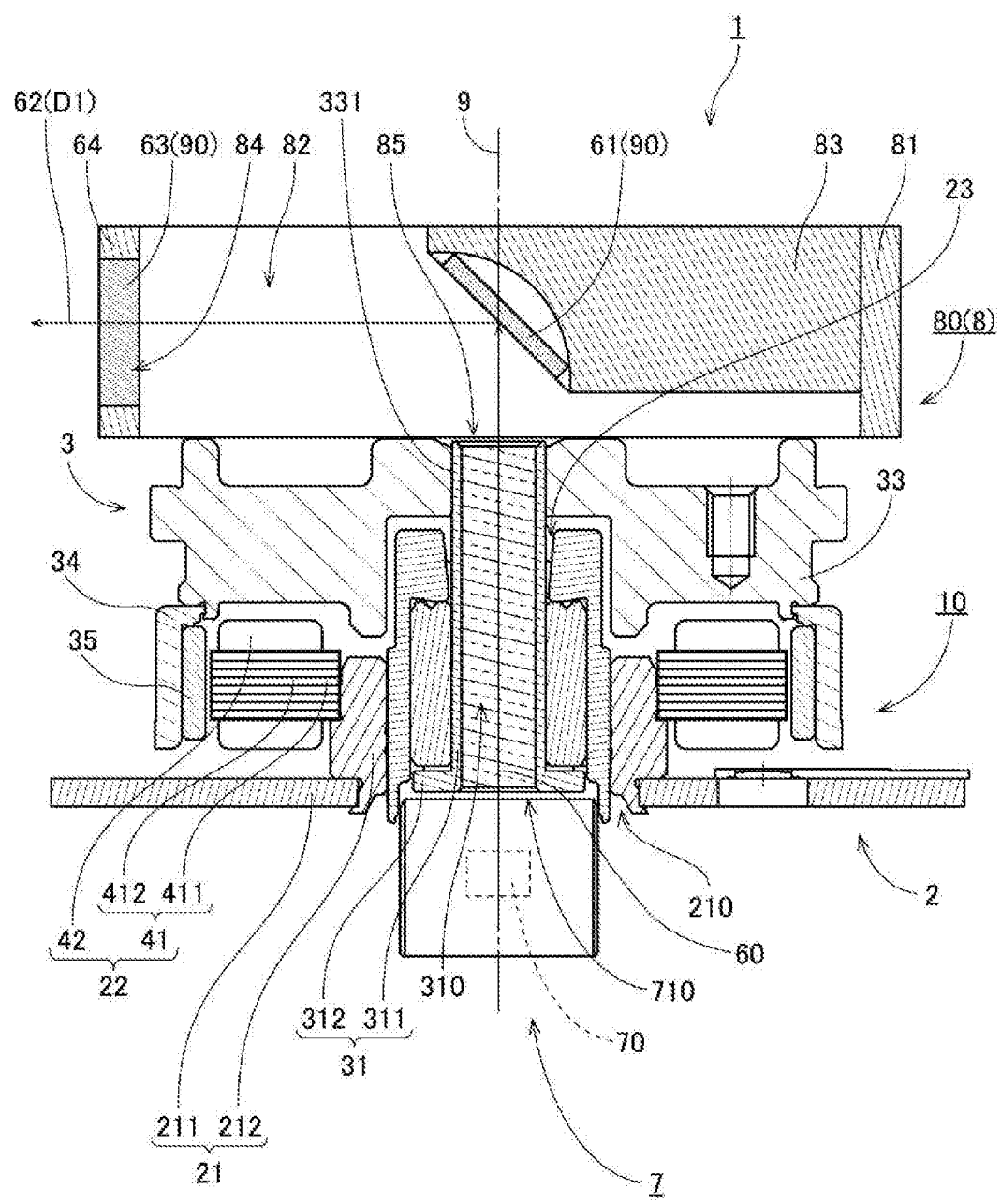
FIG. 2 is a vertical sectional view of the rotary drive apparatus according to the first preferred embodiment.

Next, the structure of the motor 10 will now be described in more detail below. FIG. 2 is a vertical sectional view of the rotary drive apparatus 1 according to the first preferred embodiment. Referring to FIG. 2, the motor 10 includes a stationary portion 2 and a rotating portion 3. The stationary portion 2 is arranged to be stationary relative to a casing or the like (not shown) in which the rotary drive apparatus 1 is arranged. The rotating portion 3 is supported through a bearing portion 23, which will be described below, to be rotatable about the central axis 9 with respect to the stationary portion 2.

The stationary portion 2 according to the present preferred embodiment includes a base portion 21, a stator 22, and the bearing portion 23, which will be described below.

The base portion 21 is arranged to support the stator 22, which will be described below. The base portion 21 includes a base body 211 and a stator holder 212.

The base body 211 is a plate-shaped member arranged to support the stator holder 212. A metal, such as, for example, an aluminum alloy or stainless steel, is used as a material of the base body 211. The base body 211 is arranged to extend radially outward from an outer circumference of the stator holder 212. When the motor 10 is used, the base body 211 is, for example, fixed to the casing or the like in which the rotary drive apparatus 1 is arranged through screws or the like. Note that a circuit board (not shown), which is arranged to supply electric drive currents to the motor 10, may be arranged on or embedded in an upper surface or a lower surface of the base body 211.

The stator holder 212 is a cylindrical member arranged to extend in the axial direction. A lower end portion of the stator holder 212 is inserted in a through hole 210 of the base body 211, and is fixed to the base body 211 by crimping.

Note, however, that the stator holder 212 may alternatively be fixed to the base body 211 by another method, such as, for example, welding. Also note that the base body 211 and the stator holder 212 may alternatively be defined by a single continuous monolithic member.

The stator 22 is an armature including a stator core 41 and a plurality of coils 42. The stator 22 is arranged above at least a portion of the base portion 21. The stator core 41 is defined by, for example, laminated steel sheets, that is, electromagnetic steel sheets, such as silicon steel sheets, placed one upon another in the axial direction. The stator core 41 is directly supported by the base portion 21 by being fixed to an outer circumferential surface of the stator holder 212 through, for example, an adhesive. Note that the stator 22 may alternatively be indirectly supported by the base portion 21 with another member (not shown) interposed therebetween.

In addition, the stator core 41 includes a core back 411 in the shape of a circular ring, and a plurality of teeth 412 arranged to project radially outward from the core back 411. The coils 42 are a collection of conducting wires wound around the teeth 412. The electric drive currents for the motor 10 are supplied from an external power supply (not shown) to the coils 42 through the aforementioned circuit board and the conducting wires. The teeth 412 and the coils 42 are preferably arranged in the form of a circular ring and at substantially regular intervals in a circumferential direction about the central axis 9.

Figure 3:
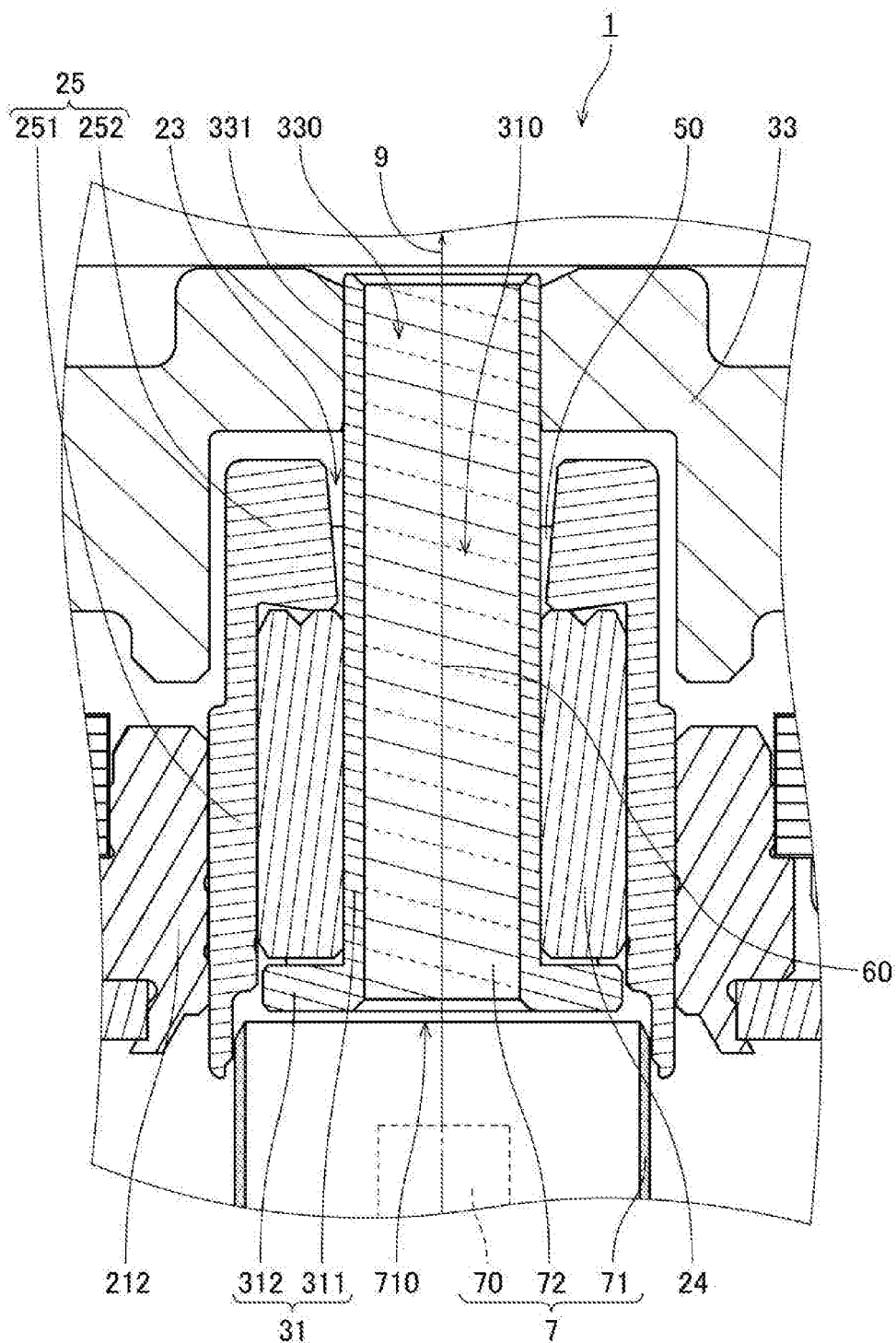
FIG. 3 is a partial vertical sectional view of the rotary drive apparatus according to the first preferred embodiment.

FIG. 3 is a partial vertical sectional view of the rotary drive apparatus 1 according to the first preferred embodiment. Referring to FIG. 3, the bearing portion 23 includes a sleeve portion 24 and a cap 25. In addition, the bearing portion 23 is arranged to rotatably support a hollow shaft 31 of the rotating portion 3, which will be described below.

The sleeve portion 24 is arranged to extend in the axial direction to assume an annular shape around the hollow shaft 31, which will be described below. The sleeve portion 24 is inserted radially inside of a cap tubular portion 251, which will be described below, of the cap 25, and is fixed to an inner circumferential surface of the cap tubular portion 251 through, for example, an adhesive. An upper end portion of the sleeve portion 24 is arranged axially below a lower end portion of a cap projecting portion 252, which will be described below. In addition, a lower end portion of the sleeve portion 24 is arranged axially above an upper end portion of a shaft annular portion 312, which will be described below. Further, a lower surface of the sleeve portion 24 is arranged opposite to an upper surface of the shaft annular portion 312, which will be described below, with a slight gap therebetween. Furthermore, an inner circumferential surface of the sleeve portion 24 is arranged opposite to an outer circumferential surface of a shaft body 311, which will be described below, with a slight gap therebetween. Note that the sleeve portion 24 may be defined by a plurality of members.

The cap 25 is arranged to extend in the axial direction to assume an annular shape around and above the sleeve portion 24. The cap 25 is inserted radially inside of the stator holder 212, and is fixed to an inner circumferential surface of the stator holder 212 through, for example, an adhesive. An upper end portion of the cap 25 is arranged axially above an upper end portion of the stator holder 212 and an upper end portion of the stator 22. In addition, a lower end portion of the cap 25 is arranged axially below the lower end portion of the stator holder 212 and a lower end portion of the stator 22. Further, an outer circumferential surface of an upper portion of the cap 25 is arranged radially opposite to at least a portion of an inner circumferential surface of a rotor hub portion 33, which will be described below, with a gap therebetween. Note that the cap 25 may be defined by a plurality of members.

The cap 25 includes the cap tubular portion 251 and the cap projecting portion 252. The cap tubular portion 251 is arranged to extend in the axial direction to assume an annular shape. In addition, the inner circumferential surface of the cap tubular portion 251 is fixed to an outer circumferential surface of the sleeve portion 24. The cap projecting portion 252 is arranged to extend radially inward from an upper end portion of the cap tubular portion 251. An inner circumferential surface of the cap projecting portion 252 is arranged radially opposite to the outer circumferential surface of the shaft body 311, which will be described below, with a slight gap therebetween.

The structure of the bearing portion 23 will be described in detail later.

The rotating portion 3 according to the present preferred embodiment includes the hollow shaft 31, the rotor hub portion 33, a yoke 34, and a magnet 35.

The hollow shaft 31 is a cylindrical member arranged to extend in the axial direction along the central axis 9 radially inside of the sleeve portion 24 and the cap 25. A through hole 310 passing through the hollow shaft 31 in the axial direction is defined around the central axis 9 radially inside of the hollow shaft 31. The through hole 310 defines a light path along which the incoming light 60 travels. A metal, such as, for example, stainless steel, is used as a material of the hollow shaft 31. The material of the hollow shaft 31 may be either magnetic or nonmagnetic. An upper end portion of the hollow shaft 31 is arranged to project upward above the upper end portion of each of the sleeve portion 24 and the cap 25. In addition, a lower end portion of the hollow shaft 31 is arranged to project downward below the lower end portion of the sleeve portion 24, and is arranged at a level higher than that of the lower end portion of the cap 25. The light source 70 of the laser module 7, which will be described below, is arranged below the lower end portion of the hollow shaft 31. Further, a light-transmitting member 72, which will be described below, is arranged to be in contact with an inner circumferential surface of the hollow shaft 31 over the entire circumferential extent of the inner circumferential surface of the hollow shaft 31, over at least a portion of the vertical extent of the through hole 310. Details thereof will be described below.

The hollow shaft 31 includes the shaft body 311 and the shaft annular portion 312. The shaft body 311 is a cylindrical portion of the hollow shaft 31 arranged to extend along the central axis 9. The shaft annular portion 312 is a disk-shaped portion arranged to extend radially outward from a lower end portion of the shaft body 311. The upper surface of the shaft annular portion 312 and the lower surface of the sleeve portion 24 are arranged axially opposite to each other with the slight gap therebetween. Note that the shaft body 311 and the shaft annular portion 312 may be defined either by a single monolithic member or by separate members. Also note that the hollow shaft 31 and the rotor hub portion 33, which will be described below, may be defined either by separate members or by a single monolithic member.

The rotor hub portion 33 is arranged to extend radially outward from a peripheral portion of the upper end portion of the hollow shaft 31 to assume an annular shape around the hollow shaft 31. An aluminum alloy or stainless steel, for example, is used as a material of the rotor hub portion 33. The rotating portion 3 further includes a fixing portion 331 arranged to fix the inner circumferential surface of the rotor hub portion 33 and an outer circumferential surface of the upper end portion of the hollow shaft 31 to each other. Specifically, at the fixing portion 331, the upper end portion of the hollow shaft 31 is press fitted in a through hole 330 defined radially inside of the rotor hub portion 33 and passing through the rotor hub portion 33 in the axial direction. Note that, at the fixing portion 331, the upper end portion of the hollow shaft 31 may be fixed to the rotor hub portion 33 through adhesion, welding, screwing, or the like. In addition, the flywheel 8, which will be described below, is fixed to an upper portion of the rotor hub portion 33. Note that another member, such as, for example, an inertia member (not shown), may be additionally fixed to the rotor hub portion 33.

The yoke 34 is a cylindrical member fixed to a radial outside of the magnet 35, which will be described below, to hold the magnet 35. An outer circumferential surface of the magnet 35 is fixed to an inner circumferential surface of the yoke 34. The yoke 34 is arranged to be substantially coaxial with the central axis 9. An upper end portion of the yoke 34 is fixed to a lower portion of the rotor hub portion 33 through an adhesive or by crimping, for example. A ferromagnetic material, such as, for example, iron, is used as a material of the yoke 34. This contributes to preventing magnetic flux generated from the magnet 35, which will be described below, from escaping outward.

The magnet 35 is fixed to the inner circumferential surface of the yoke 34 through, for example, an adhesive. A permanent magnet in the shape of a circular ring is used as the magnet 35 according to the present preferred embodiment. The magnet 35 is cylindrical or substantially cylindrical, and is arranged radially outside of the stator 22. An inner circumferential surface of the magnet 35 is arranged radially opposite to a radially outer end surface of each of the teeth 412 of the stator 22 with a slight gap therebetween. In addition, the inner circumferential surface of the magnet 35 includes north and south poles arranged to alternate with each other in the circumferential direction. Note that a plurality of magnets may be used in place of the magnet 35 in the shape of a circular ring. In the case where the plurality of magnets are used, the magnets are arranged on the inner circumferential surface of the yoke 34 such that pole surfaces of the north poles and pole surfaces of the south poles alternate with each other in the circumferential direction. The magnet 35 according to the present preferred embodiment is indirectly fixed to the rotor hub portion 33 through the yoke 34 as described above. Note that the magnet 35 may alternatively be directly fixed to the rotor hub portion 33 without the yoke 34 intervening therebetween.

Once, in the motor 10 described above, the electric drive currents are supplied to the coils 42 through the aforementioned circuit board, magnetic flux is generated around each of the teeth 412. Then, interaction between the magnetic flux of the teeth 412 and magnetic flux of the magnet 35 produces a circumferential torque between the stationary portion 2 and the rotating portion 3, so that the rotating portion 3 is caused to rotate about the central axis 9 with respect to the stationary portion 2. In addition, the flywheel 8, which is fixed to an upper side of the rotor hub portion 33, is caused to rotate about the central axis 9 together with the rotating portion 3.

Next, the structure of a bearing mechanism according to the present preferred embodiment will now be described in detail below. The following description will be made with reference to FIGS. 1 to 3 appropriately.

As described above, in the bearing mechanism, the stationary portion 2, which includes the sleeve portion 24 and the cap 25, and the rotating portion 3, which includes the hollow shaft 31, are arranged opposite to each other with a gap therebetween. A lubricating oil 50 is arranged in the gap. In addition, at least one of the stationary portion 2 and the rotating portion 3 further includes a dynamic pressure groove (not shown) in a portion thereof which defines a portion of the gap, such as, for example, the inner circumferential surface of the sleeve portion 24 or an outer circumferential surface of the hollow shaft 31. A fluid dynamic pressure is induced in the lubricating oil 50 by the dynamic pressure groove while the motor 10 is running. The rotating portion 3 is thus supported by the stationary portion 2, so that the rotating portion 3 can stably rotate. That is, in the present preferred embodiment, the bearing mechanism is defined by a combination of the sleeve portion 24 and the cap 25, both of which belong to the stationary portion 2, the hollow shaft 31, which belongs to the rotating portion 3, and the lubricating oil 50 arranged in the gap.

A polyolester oil or a diester oil, for example, is used as the lubricating oil 50. While the motor 10 is running, the rotating portion 3, which includes the hollow shaft 31, rotates about the central axis 9 while being supported through the lubricating oil 50 to be rotatable with respect to the bearing portion 23, which includes the sleeve portion 24 and the cap 25.

The lubricating oil 50 is arranged to exist continuously in the gap between the outer circumferential surface of the shaft body 311 and the inner circumferential surface of the cap projecting portion 252, the gap between the outer circumferential surface of the shaft body 311 and the inner circumferential surface of the sleeve portion 24, and the gap between the upper surface of the shaft annular portion 312 and the lower surface of the sleeve portion 24, and thus, the bearing mechanism has a so-called full-fill structure. This reduces the likelihood that a shock applied to the motor 10 during rotation thereof would cause a contact between the rotating portion 3 and the stationary portion 2, because the gap between the stationary portion 2 and the rotating portion 3 is filled with the lubricating oil 50.

At least one surface of the lubricating oil 50, including an upper surface of the lubricating oil 50, is arranged in the gap between the outer circumferential surface of the shaft body 311 and the inner circumferential surface of the cap projecting portion 252, and is arranged to overlap with the rotor hub portion 33 when viewed in a radial direction. Further, the outer circumferential surface of the shaft body 311 and the inner circumferential surface of the cap projecting portion 252, and the outer circumferential surface of the shaft body 311 and the inner circumferential surface of the sleeve portion 24, are arranged radially opposite to each other with a gap (i.e., a radial gap) therebetween. The aforementioned lubricating oil 50 is arranged in this gap (i.e., the radial gap).

As described above, the flywheel 8 according to the present preferred embodiment is arranged to cause the incoming light 60 emitted from the light source 70 to be emitted to the outside while changing the direction of the incoming light 60. In addition, the rotating portion 3 of the motor 10, which is arranged to support the flywheel 8, is rotatably supported through the bearing portion 23, which defines a portion of a fluid dynamic bearing. Thus, a vibration that is generated from the motor 10 while the rotary drive apparatus 1 is running is not easily transferred to the flywheel 8. This contributes to preventing the flywheel 8 from vibrating to affect a light beam emitted out of the flywheel 8. Thus, the light beam can be emitted to an outside of the flywheel 8 with high accuracy.

Figure 4:
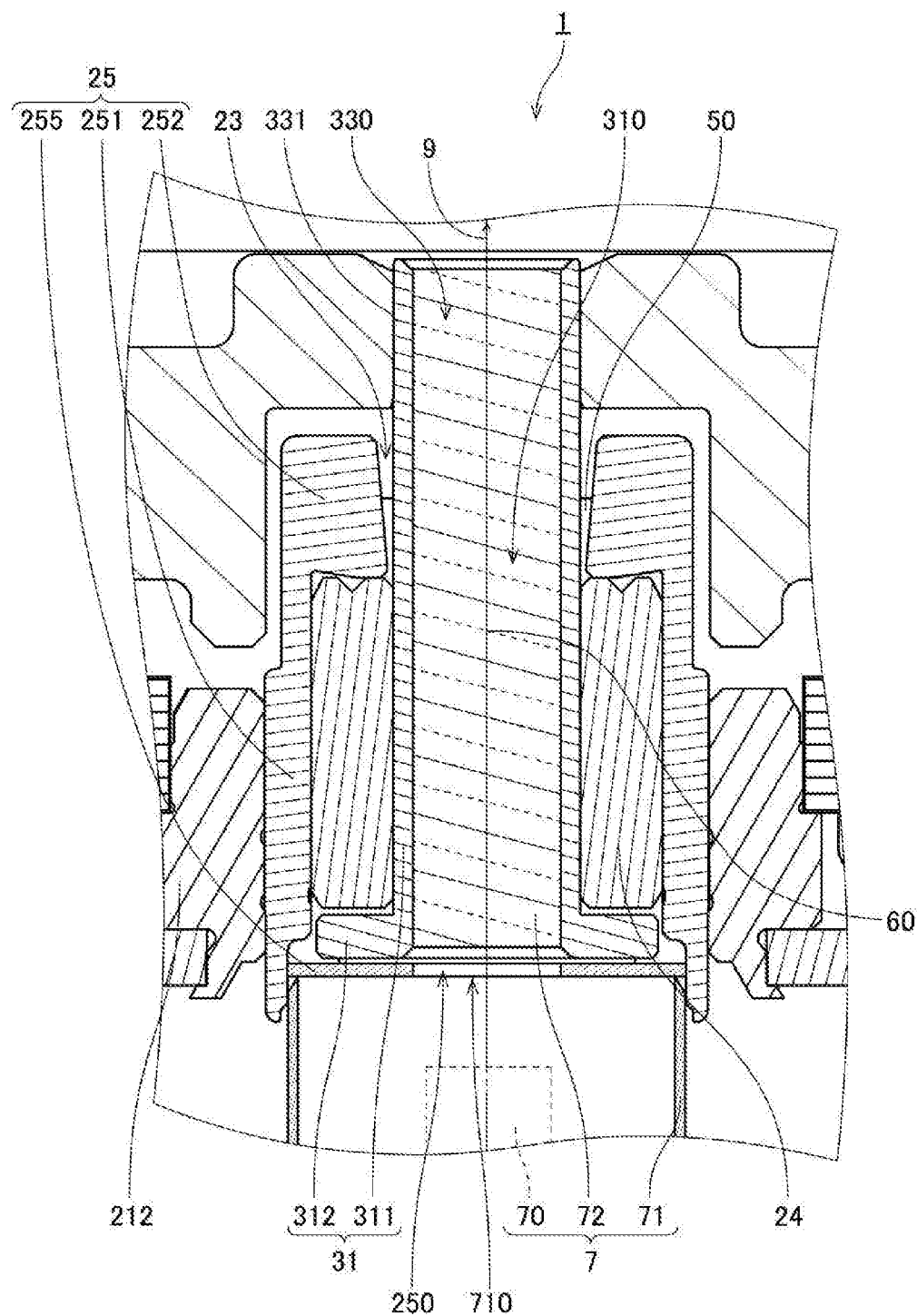
FIG. 4 is a partial vertical sectional view of a rotary drive apparatus according to a modification of the first preferred embodiment.

As in a modification of the first preferred embodiment illustrated in FIG. 4, the cap 25 may further include a cap bottom plate portion 255 in addition to the cap tubular portion 251 and the cap projecting portion 252. The cap bottom plate portion 255 is a disk-shaped member arranged to extend radially inward from a lower end portion of the cap tubular portion 251. The cap bottom plate portion 255 is thus arranged to intervene axially between the lower end portion of the hollow shaft 31 and the light source 70 of the laser module 7, which will be described below. An area adjacent to the lower end portion of the cap tubular portion 251 is covered by the cap bottom plate portion 255 to reduce the likelihood that the lubricating oil 50 will enter into the light source 70 of the laser module 7. A light-transmitting portion 250, through which the incoming light 60 is able to travel, is defined around the central axis 9 radially inside of the cap bottom plate portion 255.

In addition, in the modification illustrated in FIG. 4, a lower surface of the shaft annular portion 312 and an upper surface of the cap bottom plate portion 255 are arranged axially opposite to each other with a slight gap therebetween. The lubricating oil 50 is arranged to exist continuously in the gap between the outer circumferential surface of the shaft body 311 and the inner circumferential surface of the cap projecting portion 252, the gap between the outer circumferential surface of the shaft body 311 and the inner circumferential surface of the sleeve portion 24, the gap between the upper surface of the shaft annular portion 312 and the lower surface of the sleeve portion 24, a gap between an outer circumferential surface of the shaft annular portion 312 and the inner circumferential surface of the cap tubular portion 251, and the gap between the lower surface of the shaft annular portion 312 and the upper surface of the cap bottom plate portion 255, and thus, the bearing mechanism has a full-fill structure. This further reduces the likelihood that a shock applied to the motor 10 during the rotation thereof would cause a contact between the rotating portion 3 and the stationary portion 2, because the gap between the stationary portion 2 and the rotating portion 3 is filled with the lubricating oil 50 as in the preferred embodiment illustrated in FIG. 3.

Next, the structure of the laser module 7 will now be described below. The following description will be made with reference to FIGS. 1 to 4 appropriately.

The laser module 7 is a light transmitter containing the light source 70. In the present preferred embodiment, at least a portion of the laser module 7 is fixed to the inner circumferential surface of the cap tubular portion 251 through fitting. The laser module 7 is thus securely fixed. In addition, there is not a need to provide a separate dedicated member to fix the light source 70, such as, for example, a member that is arranged over the rotary drive apparatus 1 so as to cover the rotary drive apparatus 1, and thus, a reduced cost is achieved. Further, a portion of the laser module 7 is fitted into a portion of the rotary drive apparatus 1 in the axial direction, so that a reduced axial dimension of the rotary drive apparatus 1 as a whole is achieved. Note that the laser module 7 may alternatively be fixed by any other desirable method. For example, an outer circumferential surface of at least a portion of the laser module 7 and an inner circumferential surface of at least a portion of the cap tubular portion 251, including the lower end portion of the cap tubular portion 251, may alternatively be fixed to each other through adhesion, press fitting, screwing, or the like.

In addition, the laser module 7 further includes a casing 71 and the light-transmitting member 72 in addition to the light source 70. The casing 71 includes a cylindrical portion arranged to extend in the axial direction and define an exterior of the laser module 7. At least a portion of the laser module 7 is arranged below the hollow shaft 31 and radially inside of the base portion 21.

The light-transmitting member 72 is made of a material having a high light transmissivity, and containing glass, acrylic, polycarbonate, or the like. The light-transmitting member 72 is a columnar member arranged to extend in the axial direction. In addition, the light-transmitting member 72 is arranged to be in contact with the inner circumferential surface of the hollow shaft 31. Thus, the light path along which the incoming light 60 emitted from the light source 70 travels is defined in the through hole 310 of the hollow shaft 31.

The light-transmitting member 72 is arranged to be in contact with the inner circumferential surface of the hollow shaft 31 over the entire circumferential extent of the inner circumferential surface of the hollow shaft 31, over at least a portion of the vertical extent of the through hole 310. This leads to improved working accuracy in finishing in a manufacturing process, such as, for example, grinding the outer circumferential surface of the hollow shaft 31. This in turn contributes to preventing a deformation of the hollow shaft 31, and reducing the likelihood of a tilt or a displacement of the flywheel 8 supported by the rotor hub portion 33, which is fixed to the hollow shaft 31. Thus, a light beam can be emitted to the outside of the flywheel 8 with high accuracy. It is desirable that at least a portion of the light-transmitting member 72 is arranged to overlap with the aforementioned fixing portion 331, which is arranged to fix the rotor hub portion 33 and the hollow shaft 31 to each other, when viewed in the radial direction. In addition, it is desirable that, at least radially inside of the fixing portion 331, the light-transmitting member 72 is arranged to be in contact with the inner circumferential surface of the hollow shaft 31 over the entire circumferential extent thereof. This will enable a portion of the outer circumferential surface of the hollow shaft 31 to which the rotor hub portion 33 is fixed to be finished with particularly high accuracy.

In addition, in the present preferred embodiment, the light source 70 is contained in a portion of the laser module 7 which lies below the lower end portion of the hollow shaft 31. Thus, the light source 70 can be securely held below the hollow shaft 31 in the case where the inside diameter of the hollow shaft 31 is so small that the light source 70 cannot be arranged in the through hole 310 of the hollow shaft 31.

As described above, the incoming light 60 emitted from the light source 70 travels upward along the central axis 9 of the motor 10. Further, the incoming light 60 further travels upward through an opening 710 of the casing 71 at an upper end thereof, and the light-transmitting member 72 arranged in the through hole 310 of the hollow shaft 31. Note that, in the modification illustrated in FIG. 4, in which the aforementioned cap bottom plate portion 255 is provided, the incoming light 60 travels through the light-transmitting portion 250 as well.

Next, the structure of the flywheel 8 will now be described below. The following description will be made with reference to FIGS. 1 and 2 appropriately.

The flywheel 8 is arranged above the motor 10, and is supported by an upper end portion of the rotating portion 3 of the motor 10. The flywheel 8 is fixed to an upper surface of the rotor hub portion 33 of the rotating portion 3 through, for example, engagement, an adhesive, or the like. In addition, the flywheel 8 is arranged to rotate about the central axis 9 together with the rotating portion 3. The flywheel 8 includes a main body 80 and optical components 90 each of which is arranged to reflect the incoming light 60 or allow the incoming light 60 to pass therethrough. The optical components 90 include a mirror 61 and a lens 63. The main body 80 is arranged to support each of the mirror 61 and the lens 63. A resin, for example, is used as a material of the main body 80. Glass, for example, is used as materials of the mirror 61 and the lens 63. The glass is not limited to particular types of glass. For example, organic glass, inorganic glass, a resin, a metal, or other materials may be used as the materials of the mirror 61 and the lens 63.

The mirror 61 is arranged to have a rectangular or circular external shape. The mirror 61 is fixed to a resin member of a mirror support portion 83 of the main body 80, which will be described below, and at least a portion of the mirror 61 is arranged on the central axis 9. In addition, a reflecting surface of the mirror 61 is inclined at an angle of 45 degrees with respect to the axial direction and a first radial direction D1. The incoming light 60 impinges on a central portion of the mirror 61. The central portion of the mirror 61 refers to the entire mirror 61, excluding a peripheral portion of the mirror 61. A fully reflective mirror, for example, is used as the mirror 61. The incoming light 60 is reflected by the mirror 61 inside of the flywheel 8, and is changed in direction. Note that, instead of the mirror 61, a prism (not shown) or the like may alternatively be used to change the direction of the incoming light 60.

The lens 63 is arranged to have a rectangular or circular external shape. The lens 63 is fixed in a through hole 84, which is arranged to pass through a tubular portion 81 of the main body 80 in the first radial direction D1, through, for example, adhesion or engagement through a lens frame 64 arranged to be in contact with at least a portion of a peripheral portion of the lens 63. Note that the lens 63 may alternatively be directly fixed to the main body 80 without the intervention of the lens frame 64. In addition, the lens 63 is arranged at right angles to the first radial direction D1, that is, in parallel with the central axis 9, in a state in which the lens 63 is fixed to the main body 80. The incoming light 60 is caused by the mirror 61 to change in direction inside of the flywheel 8, and passes through a central portion of the lens 63 to be emitted to the outside of the flywheel 8. The central portion of the lens 63 refers to the entire lens 63, excluding the peripheral portion of the lens 63.

The main body 80 includes the tubular portion 81, a hollow portion 82, and the mirror support portion 83. The tubular portion 81 is a cylindrical member arranged to extend along the central axis 9. The hollow portion 82 is a cavity defined inside of the main body 80. The mirror support portion 83 is arranged to extend radially inward from an inner circumferential surface of the tubular portion 81. The mirror 61 is fixed to the mirror support portion 83 around the central axis 9. Further, a through hole 85 is defined in a lower surface of the main body 80. The through hole 85 is arranged to pass through a portion or a whole of the lower surface of the main body 80 in the axial direction, the through hole 85 extending on and around the central axis 9.

The incoming light 60 emitted from the light source 70 travels upward through the opening 710. Further, the incoming light 60 passes through the light-transmitting member 72 arranged in the through hole 310 of the hollow shaft 31 of the motor 10 and the through hole 85 defined in a lower surface of the flywheel 8, and travels upward along the central axis 9 in the hollow portion 82. Then, the incoming light 60 is reflected by the mirror 61 to become reflected light 62. The reflected light 62 further travels in the first radial direction D1 in the hollow portion 82, and is emitted to the outside of the rotary drive apparatus 1 through the lens 63 fitted in the tubular portion 81.

The mirror 61 of the flywheel 8 is arranged to reflect the incoming light 60 coming from the light source 70 and emit the reflected light 62 to the outside of the rotary drive apparatus 1 while rotating about the central axis 9 together with the rotating portion 3 of the motor 10. Thus, a wide range can be irradiated with light. Note that the rotation speed of the rotary drive apparatus 1 can be recognized by sensing the reflected light 62, which is emitted out of the flywheel 8, using an external sensor (not shown). Note that an outer circumferential surface of the main body 80 has a reflectivity lower than that of a front surface of the mirror 61. This contributes to preventing diffuse reflection of the incoming light 60 coming from the light source 70.

Note that the rotary drive apparatus 1 may further include, in addition to the flywheel 8 arranged to emit the reflected light 62 to the outside in the first radial direction D1, another flywheel (not shown) which is arranged to emit reflected light to the outside in a second radial direction different from the first radial direction D1, and which is arranged, for example, above the flywheel 8. In this case, a half mirror the transmissivity and reflectivity of which are substantially equal is used as the mirror 61. Then, a half of the incoming light 60 which impinges on the mirror 61 in the flywheel 8 is reflected in the first radial direction D1 to be emitted to the outside. In addition, a remaining half of the incoming light 60 which impinges on the mirror 61 is allowed to pass through the mirror 61 and travel further upward. Then, in the other flywheel arranged above the flywheel 8, all the remaining half of the incoming light 60 is reflected in the second radial direction, using a fully reflective mirror (not shown), to be emitted to the outside. Note that a plurality of mirrors (not shown), including a half mirror, which are arranged to reflect the incoming light 60 in mutually different directions may alternatively be installed in the single flywheel 8 of the rotary drive apparatus 1.

When light is emitted out in the two different directions, i.e., the first radial direction D1 and the second radial direction, as described above, light beams that are emitted out in the two different directions take different times to reach an object to be irradiated with light while the motor 10 is running, and this makes it possible to precisely recognize the three-dimensional position of the object in a space. Note that the other flywheel may alternatively be arranged in a rotary drive apparatus (not shown) other than the rotary drive apparatus 1 including the flywheel 8.

Figure 5:
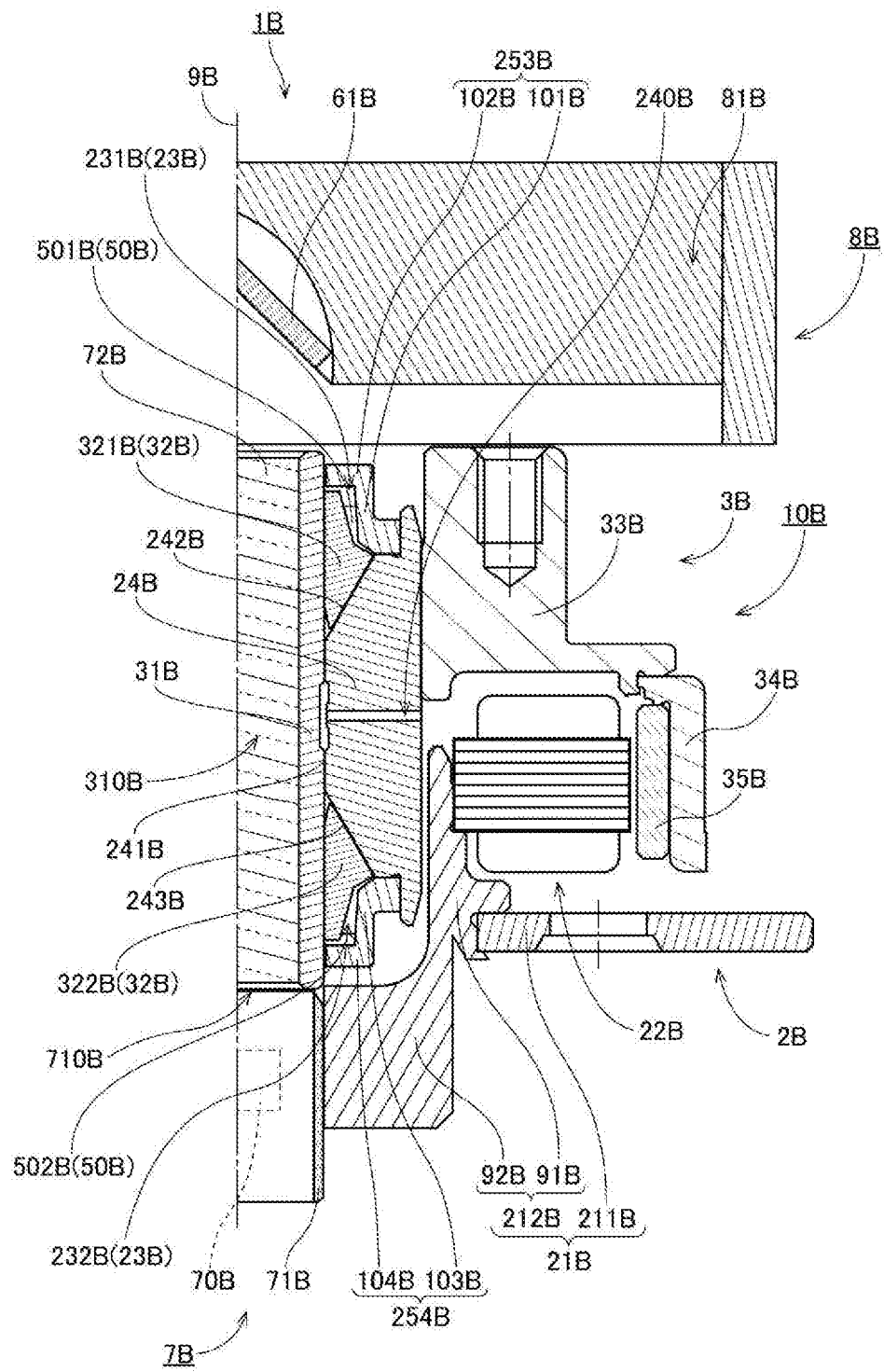
FIG. 5 is a partial vertical sectional view of a rotary drive apparatus according to a second preferred embodiment of the present invention.

FIG. 5 is a partial vertical sectional view of a rotary drive apparatus 1B according to a second preferred embodiment of the present invention. Note that the second preferred embodiment will be described below with focus on differences from the first preferred embodiment, and that features of the second preferred embodiment which are shared by the first preferred embodiment will not be described to avoid redundancy.

Referring to FIG. 5, the rotary drive apparatus 1B includes a motor 10B, a laser module 7B, and a flywheel 8B. The flywheel 8B has a structure equivalent to that of the flywheel 8 according to the first preferred embodiment, and accordingly, a description of the flywheel 8B is omitted to avoid redundancy.

Next, the structure of the motor 10B will now be described below. The motor 10B includes a stationary portion 2B and a rotating portion 3B. The stationary portion 2B includes a base portion 21B, a stator 22B, a hollow shaft 31B, and annular portions 32B.

The base portion 21B includes a base body 211B and a stator holder 212B. The base body 211B is a plate-shaped member arranged to support the stator holder 212B. The base body 211B is fixed to the stator holder 212B, and is arranged to extend radially outward from an outer circumference of the stator holder 212B. The stator holder 212B is a cylindrical member including an outer circumferential surface to which the stator 22B is fixed above the base body 211B. The stator holder 212B includes a holder body 91B and a module holding portion 92B. The holder body 91B is a cylindrical portion including an upper portion to which the stator 22B is fixed, and the holder body 91B is arranged to extend axially downward beyond the base body 211B. The module holding portion 92B is a plate-shaped portion arranged to extend radially inward from the holder body 91B. At least a portion of the laser module 7B, which will be described below, is arranged radially inside of the module holding portion 92B of the stator holder 212B. At least a portion of an outer circumferential surface of the laser module 7B is fixed to an inner circumferential surface of the module holding portion 92B. This leads to a reduced cost, without the need to provide a separate dedicated member to fix the laser module 7B, which includes a light source 70B. Further, a reduced axial dimension of the rotary drive apparatus 1B as a whole, which includes the laser module 7B, can be achieved.

The stator 22B has a structure equivalent to that of the stator 22 according to the first preferred embodiment. The stator 22B is arranged above the base body 211B. The stator 22B is supported by being fixed to the outer circumferential surface of the stator holder 212B through, for example, an adhesive.

The hollow shaft 31B is a cylindrical member arranged to extend in the axial direction along a central axis 9B radially inside of the rotating portion 3B. A through hole 310B passing through the hollow shaft 31B in the axial direction is defined around the central axis 9B radially inside of the hollow shaft 31B. The through hole 310B defines a light path along which incoming light (not shown) travels. An outer circumferential surface of the hollow shaft 31B and an inner circumferential surface 241B of a sleeve portion 24B are arranged radially opposite to each other with a slight gap therebetween. Note that the hollow shaft 31B and each of the annular portions 32B, which will be described below, may be defined by a single monolithic member. In addition, in the present preferred embodiment, an upper portion of a casing 71B, which is arranged to contain the light source 70B of the laser module 7B, is fixed to a lower portion of the hollow shaft 31B. Thus, the base portion 21B, the stator 22B, the hollow shaft 31B, the annular portions 32B, which will be described below, and the laser module 7B, which will be described below, are fixed to one another. In addition, a light-transmitting member 72B of the laser module 7B is arranged to be in contact with an inner circumferential surface of the hollow shaft 31B over the entire circumferential extent of the inner circumferential surface of the hollow shaft 31B, over at least a portion of the vertical extent of the through hole 310B.

The annular portions 32B include a first annular portion 321B and a second annular portion 322B. The first annular portion 321B is a member fixed to an outer circumferential surface of an upper portion of the hollow shaft 31B, and arranged to project radially outward therefrom over the entire circumferential extent thereof. In addition, the second annular portion 322B is a member fixed to an outer circumferential surface of the lower portion of the hollow shaft 31B, and arranged to project radially outward therefrom over the entire circumferential extent thereof.

An outer circumferential surface of a lower portion of the first annular portion 321B and an upper inclined surface 242B of the sleeve portion 24B, which will be described below, are arranged obliquely opposite to each other with a slight gap therebetween. The upper inclined surface 242B is included in an upper portion of the sleeve portion 24B, and is inclined with respect to the axial direction. Meanwhile, an outer circumferential surface of an upper portion of the second annular portion 322B and a lower inclined surface 243B of the sleeve portion 24B, which will be described below, are arranged obliquely opposite to each other with a slight gap therebetween. The lower inclined surface 243B is included in a lower portion of the sleeve portion 24B, and is inclined with respect to the axial direction.

Further, an outer circumferential surface of an upper portion of the first annular portion 321B and an inner circumferential surface of a first tubular portion 101B of a first cap 253B, which will be described below, are arranged radially opposite to each other with a slight gap therebetween. In addition, an outer circumferential surface of a lower portion of the second annular portion 322B and an inner circumferential surface of a second tubular portion 103B of a second cap 254B are arranged radially opposite to each other with a slight gap therebetween.

The rotating portion 3B according to the present preferred embodiment includes a rotor hub portion 33B, a yoke 34B, a magnet 35B, and a bearing portion 23B. The yoke 34B and the magnet 35B have structures equivalent to those of the yoke 34 and the magnet 35, respectively, according to the first preferred embodiment, and accordingly, descriptions of the yoke 34B and the magnet 35B are omitted to avoid redundancy.

The rotor hub portion 33B is arranged to extend radially outward from an outer circumference of the sleeve portion 24B, which will be described below, to assume an annular shape. An inner circumferential surface of the rotor hub portion 33B is fixed to an outer circumferential surface of the sleeve portion 24B, which will be described below. In addition, the flywheel 8B is fixed to an upper portion of the rotor hub portion 33B. Further, the magnet 35B is indirectly fixed to a radially outer portion of a lower portion of the rotor hub portion 33B with the yoke 34B interposed therebetween. Note that the magnet 35B may alternatively be directly fixed to the rotor hub portion 33B.

Referring to FIG. 5, the bearing portion 23B includes the sleeve portion 24B, the first cap 253B, and the second cap 254B.

The sleeve portion 24B is arranged to extend in the axial direction to assume an annular shape around the hollow shaft 31B. The sleeve portion 24B is inserted radially inside of the rotor hub portion 33B, and is fixed to the rotor hub portion 33B through, for example, an adhesive. An upper end portion of the sleeve portion 24B is arranged axially above an upper end portion of the stator holder 212B and an upper end portion of the stator 22B. In addition, a lower end portion of the sleeve portion 24B is arranged axially below at least a portion of the stator holder 212B and at least a portion of the stator 22B. Note that the sleeve portion 24B may be defined by a plurality of members.

The first cap 253B is a member arranged to extend radially inward from the upper end portion of the sleeve portion 24B. An upper end portion of the first cap 253B is arranged lower than an upper end portion of the hollow shaft 31B. The first cap 253B includes the first tubular portion 101B and a first plate portion 102B. The first tubular portion 101B is fixed to the sleeve portion 24B in the vicinity of the upper end portion of the sleeve portion 24B, and is arranged to extend upward in the axial direction to assume an annular shape. The first plate portion 102B is arranged to extend radially inward from an upper end portion of the first tubular portion 101B.

The second cap 254B is a member arranged to extend radially inward from the lower end portion of the sleeve portion 24B. A lower end portion of the second cap 254B is arranged higher than a lower end portion of the hollow shaft 31B. The second cap 254B includes the second tubular portion 103B and a second plate portion 104B. The second tubular portion 103B is fixed to the sleeve portion 24B in the vicinity of the lower end portion of the sleeve portion 24B, and is arranged to extend downward in the axial direction to assume an annular shape. The second plate portion 104B is arranged to extend radially inward from a lower end portion of the second tubular portion 103B.

Next, the structure of a bearing mechanism according to the present preferred embodiment will now be described in detail below.

As described above, the stationary portion 2B, which includes the hollow shaft 31B, the first annular portion 321B, and the second annular portion 322B, and the rotating portion 3B, which includes the sleeve portion 24B, the first cap 253B, and the second cap 254B, are arranged opposite to each other with a gap therebetween. In addition, a lubricating oil 50B is arranged in this gap. Further, the inner circumferential surface 241B, the upper inclined surface 242B, and the lower inclined surface 243B of the sleeve portion 24B, for example, include dynamic pressure grooves (not shown) defined therein. A fluid dynamic pressure is induced in the lubricating oil 50B by the dynamic pressure grooves (not shown) while the motor 10B is running. The rotating portion 3B is thus supported by the stationary portion 2B, so that the rotating portion 3B can stably rotate. That is, in the present preferred embodiment, the bearing mechanism is defined by a combination of the hollow shaft 31B, the first annular portion 321B, and the second annular portion 322B, which belong to the stationary portion 2B, a combination of the sleeve portion 24B, the first cap 253B, and the second cap 254B, which belong to the rotating portion 3B, and the lubricating oil 50B arranged in the gap.

The lubricating oil 50B is arranged to exist continuously in the gap between the outer circumferential surface of the upper portion of the first annular portion 321B and the inner circumferential surface of the first tubular portion 101B of the first cap 253B, the gap between the outer circumferential surface of the lower portion of the first annular portion 321B and the upper inclined surface 242B, which is included in the upper portion of the sleeve portion 24B and is inclined with respect to the axial direction, and a gap between the outer circumferential surface of the hollow shaft 31B and an upper portion of the inner circumferential surface 241B of the sleeve portion 24B. In addition, the lubricating oil 50B is arranged to exist continuously in a gap between the outer circumferential surface of the hollow shaft 31B and a lower portion of the inner circumferential surface 241B of the sleeve portion 24B, the gap between the outer circumferential surface of the upper portion of the second annular portion 322B and the lower inclined surface 243B, which is included in the lower portion of the sleeve portion 24B and is inclined with respect to the axial direction, and the gap between the outer circumferential surface of the lower portion of the second annular portion 322B and the inner circumferential surface of the second tubular portion 103B of the second cap 254B. Note that a gap between the outer circumferential surface of the hollow shaft 31B and an axial middle portion of the inner circumferential surface 241B of the sleeve portion 24B is a space where no lubricating oil 50B exists.

As described above, the bearing mechanism according to the present preferred embodiment has a so-called partially-filled structure, in which the lubricating oil 50B exists at two or more separate locations in the gap where the stationary portion 2B and the rotating portion 3B are opposed to each other. The lubricating oil 50B includes an upper lubricating oil 501B arranged to exist above an axial middle portion of the sleeve portion 24B, and a lower lubricating oil 502B arranged to exist below the axial middle portion of the sleeve portion 24B.

That is, this bearing mechanism includes an upper bearing portion 231B and a lower bearing portion 232B provided separately. The upper bearing portion 231B is defined by members of the stationary portion 2B which include the first annular portion 321B and a portion of the hollow shaft 31B above an axial middle portion of the hollow shaft 31B, members of the rotating portion 3B which include the first cap 253B and a portion of the sleeve portion 24B above the axial middle portion of the sleeve portion 24B, and the upper lubricating oil 501B. Meanwhile, the lower bearing portion 232B is defined by members of the stationary portion 2B which include the second annular portion 322B and a portion of the hollow shaft 31B below the axial middle portion of the hollow shaft 31B, members of the rotating portion 3B which include the second cap 254B and a portion of the sleeve portion 24B below the axial middle portion of the sleeve portion 24B, and the lower lubricating oil 502B.

An upper surface of the upper lubricating oil 501B is arranged to overlap with the first tubular portion 101B of the first cap 253B when viewed in a radial direction. In addition, a lower surface of the lower lubricating oil 502B is arranged to overlap with the second tubular portion 103B of the second cap 254B when viewed in the radial direction. Further, a labyrinth structure having a complicated spatial structure is provided between the lower surface of the lower lubricating oil 502B and an opening 710B of the casing 71B of the laser module 7B. This reduces the likelihood that the lower lubricating oil 502B will evaporate and enter into the laser module 7B through the opening 710B even when the lower surface of the lower lubricating oil 502B lies near an upper end portion of the casing 71B of the laser module 7B. In addition, the sleeve portion 24B further includes a sleeve through hole 240B arranged to pass through the sleeve portion 24B in the radial direction below the first cap 253B and above the second cap 254B. This brings air in the gap where the stationary portion 2B and the rotating portion 3B are opposed to each other into communication with an exterior space through the sleeve through hole 240B, so that a pressure in the vicinity of the upper surface of the upper lubricating oil 501B and a pressure in the vicinity of the lower surface of the lower lubricating oil 502B become substantially equal to each other, which leads to a prevention of a leakage of the lubricating oil 50B due to a pressure difference.

Note that the bearing mechanism may alternatively be arranged to have a so-called full-fill structure, in which the lubricating oil 50B is arranged to exist continuously in the gap between the outer circumferential surface of the upper portion of the first annular portion 321B and the inner circumferential surface of the first tubular portion 101B of the first cap 253B, the gap between the outer circumferential surface of the lower portion of the first annular portion 321B and the upper inclined surface 242B, which is included in the upper portion of the sleeve portion 24B and is inclined with respect to the axial direction, the gap between the outer circumferential surface of the hollow shaft 31B and the inner circumferential surface 241B of the sleeve portion 24B, the gap between the outer circumferential surface of the upper portion of the second annular portion 322B and the lower inclined surface 243B, which is included in the lower portion of the sleeve portion 24B and is inclined with respect to the axial direction, and the gap between the outer circumferential surface of the lower portion of the second annular portion 322B and the inner circumferential surface of the second tubular portion 103B of the second cap 254B, that is, in the gap where the stationary portion 2B and the rotating portion 3B are opposed to each other. This reduces the likelihood that a shock applied to the motor 10B during rotation thereof would cause a contact between the rotating portion 3B and the stationary portion 2B.

Figure 6:
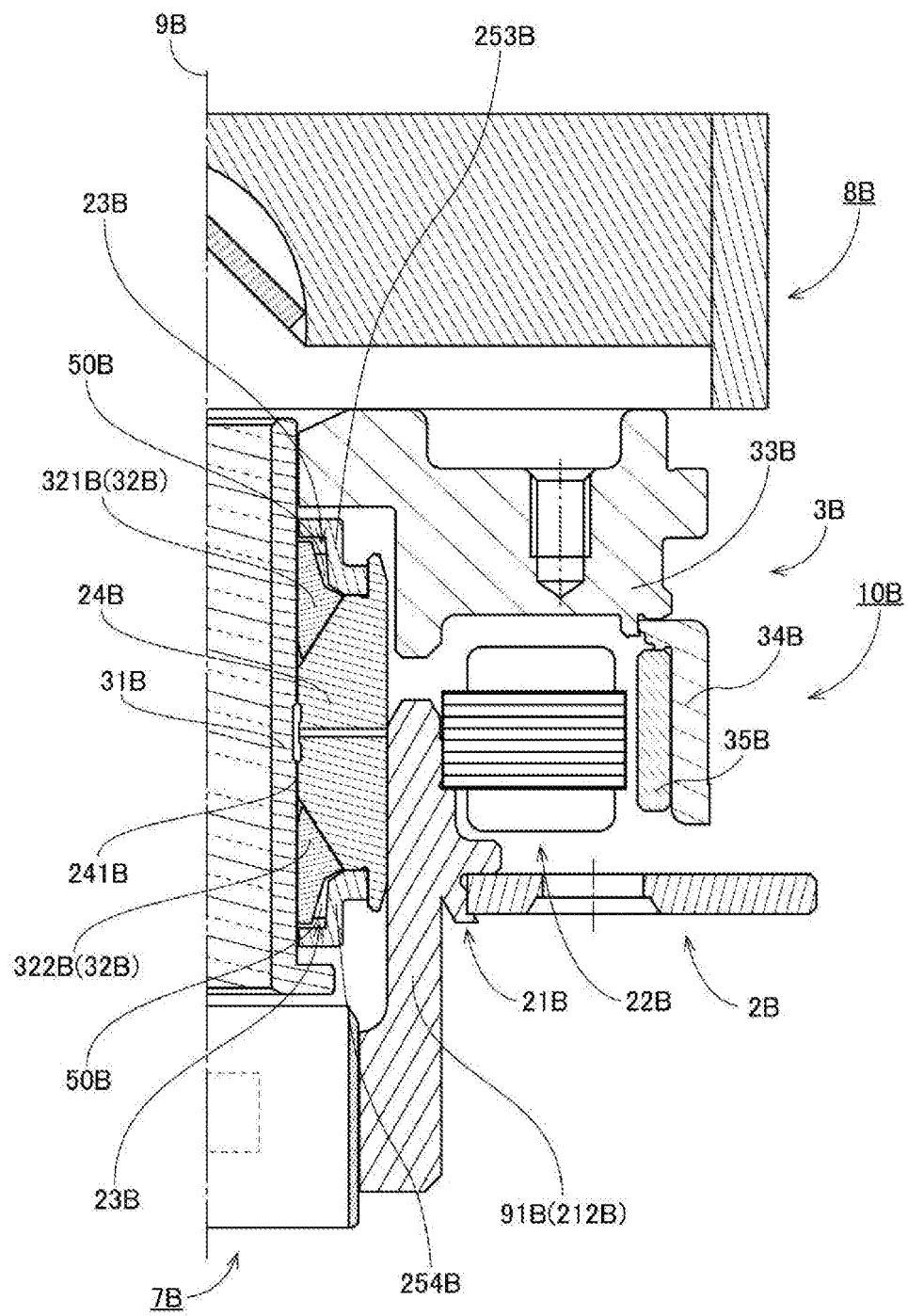
FIG. 6 is a partial vertical sectional view of a rotary drive apparatus according to a modification of the second preferred embodiment.

Referring to FIG. 6, in a modification of the second preferred embodiment of the present invention, a bearing portion 23B including a sleeve portion 24B, a first cap 253B, and a second cap 254B may be included in a stationary portion 2B, while a hollow shaft 31B and annular portions 32B may be included in a rotating portion 3B.

In the modification illustrated in FIG. 6, at least a portion of an outer circumferential surface of the sleeve portion 24B is fixed to an inner circumferential surface of a holder body 91B of a stator holder 212B. Thus, a base portion 21B, a stator 22B, the sleeve portion 24B, the first cap 253B, the second cap 254B, and a laser module 7B, which will be described below, are fixed to one another.

In addition, an inner circumferential surface of a rotor hub portion 33B and an outer circumferential surface of an upper end portion of the hollow shaft 31B are fixed to each other. Further, a flywheel 8B is fixed to an upper portion of the rotor hub portion 33B. Furthermore, a magnet 35B is indirectly fixed to a radially outer portion of a lower portion of the rotor hub portion 33B with a yoke 34B interposed therebetween.

The stationary portion 2B, which includes the sleeve portion 24B, the first cap 253B, and the second cap 254B, and the rotating portion 3B, which includes the hollow shaft 31B, a first annular portion 321B, and a second annular portion 322B, are arranged opposite to each other with a gap therebetween. In addition, a lubricating oil 50B is arranged in this gap. Further, an inner circumferential surface 241B and so on of the sleeve portion 24B, for example, include dynamic pressure grooves (not shown) defined therein. Note, however, that the dynamic pressure groove(s) (not shown) may alternatively be defined in any other desirable places. A fluid dynamic pressure is induced in the lubricating oil 50B by the dynamic pressure grooves (not shown) while a motor 10B is running. The rotating portion 3B is thus supported by the stationary portion 2B, so that the rotating portion 3B can stably rotate. That is, a bearing mechanism according to the present modification is defined by a combination of the sleeve portion 24B, the first cap 253B, and the second cap 254B, which belong to the stationary portion 2B, a combination of the hollow shaft 31B, the first annular portion 321B, and the second annular portion 322B, which belong to the rotating portion 3B, and the lubricating oil 50B arranged in the gap. While the motor 10B is running, the rotating portion 3B, which includes the hollow shaft 31B, the first annular portion 321B, and the second annular portion 322B, rotates about a central axis 9B while being supported through the lubricating oil 50B to be rotatable with respect to the stationary portion 2B, which includes the sleeve portion 24B, the first cap 253B, and the second cap 254B.

Next, the structure of the laser module 7B according to the second preferred embodiment will now be described below.

Reference is made back to FIG. 5. The laser module 7B is a light transmitter containing the light source 70B. In the present preferred embodiment, at least a portion of the laser module 7B is arranged radially inside of the base portion 21B. In addition, at least a portion of the laser module 7B is fixed to the inner circumferential surface of the module holding portion 92B of the stator holder 212B. Thus, there is not a need to provide a separate dedicated member to fix the laser module 7B, such as, for example, a member that is arranged over the rotary drive apparatus 1B so as to cover the rotary drive apparatus 1B, and thus, improved workability in assembling the rotary drive apparatus 1B is achieved. Further, at least a portion of the laser module 7B is fitted into a portion of the rotary drive apparatus 1B in the axial direction, so that a reduced axial dimension of the rotary drive apparatus 1B as a whole is achieved.

Note that an outer circumferential surface of at least a portion of the laser module 7B and an inner circumferential surface of at least a portion of the module holding portion 92B of the stator holder 212B may be fixed to each other through, for example, adhesion, press fitting, or screwing.

In addition, as is similarly the case with the first preferred embodiment, the light-transmitting member 72B is arranged to be in contact with the inner circumferential surface of the hollow shaft 31B over the entire circumferential extent of the inner circumferential surface of the hollow shaft 31B, over at least a portion of the vertical extent of the through hole 310B. This leads to improved working accuracy in finishing in a manufacturing process, such as, for example, grinding the outer circumferential surface of the hollow shaft 31B. This in turn contributes to preventing a deformation of the hollow shaft 31B, and reducing the likelihood of a tilt or a displacement of each of the annular portions 32B, each of which is fixed to the hollow shaft 31B. This leads to increased accuracy of rotation of the rotating portion 3B, which is arranged opposite to the stationary portion 2B, which includes the hollow shaft 31B and the annular portions 32B, with the gap including the lubricating oil 50B therebetween. This in turn allows a light beam to be emitted to an outside of the flywheel 8B, which is supported by the rotor hub portion 33B of the rotating portion 3B, with high accuracy.

In addition, in the present preferred embodiment, the laser module 7B is fixed to the base portion 21B, and the incoming light (not shown) emitted from the light source 70B travels through the light-transmitting member 72B in the through hole 310B of the hollow shaft 31B, and is emitted to the outside while being changed in direction in the flywheel 8B above the laser module 7B, and thus, compared to the case where a dedicated member to fix the laser module 7B is separately provided, the possibility that the dedicated member will interfere with the travel of a light beam can be eliminated.

While preferred embodiments of the present invention have been described above, it is to be understood that the present invention is not limited to the above-described preferred embodiments.

Figure 7:
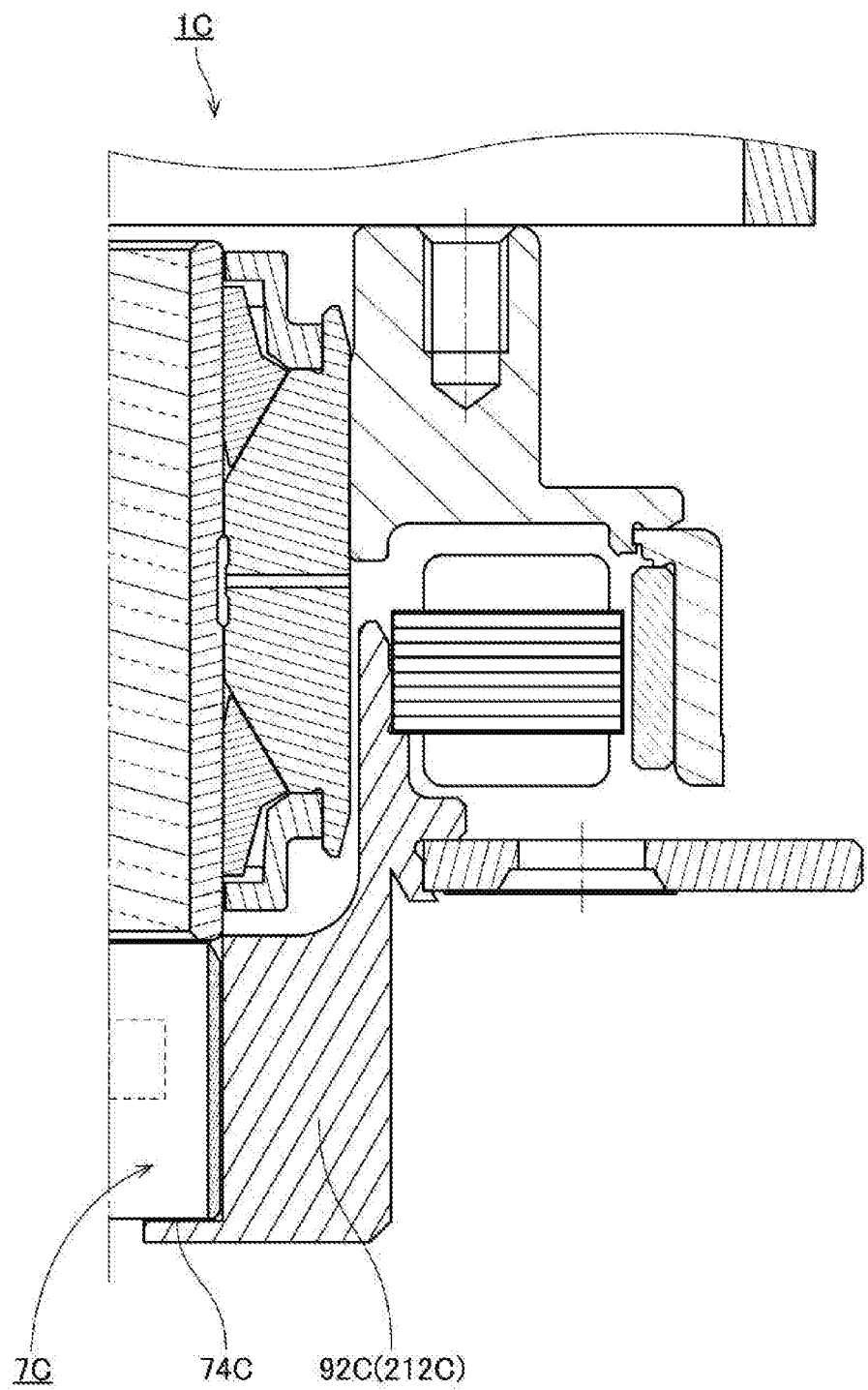
FIG. 7 is a partial vertical sectional view of a rotary drive apparatus according to a modification of the second preferred embodiment.

FIG. 7 is a partial vertical sectional view of a rotary drive apparatus 1C according to a modification of the second preferred embodiment. In the modification illustrated in FIG. 7, at least a portion (i.e., a portion 74C in FIG. 7) of a lower surface of a laser module 7C is covered with a module holding portion 92C of a stator holder 212C. The laser module 7C is thus more securely held.

Figure 8:
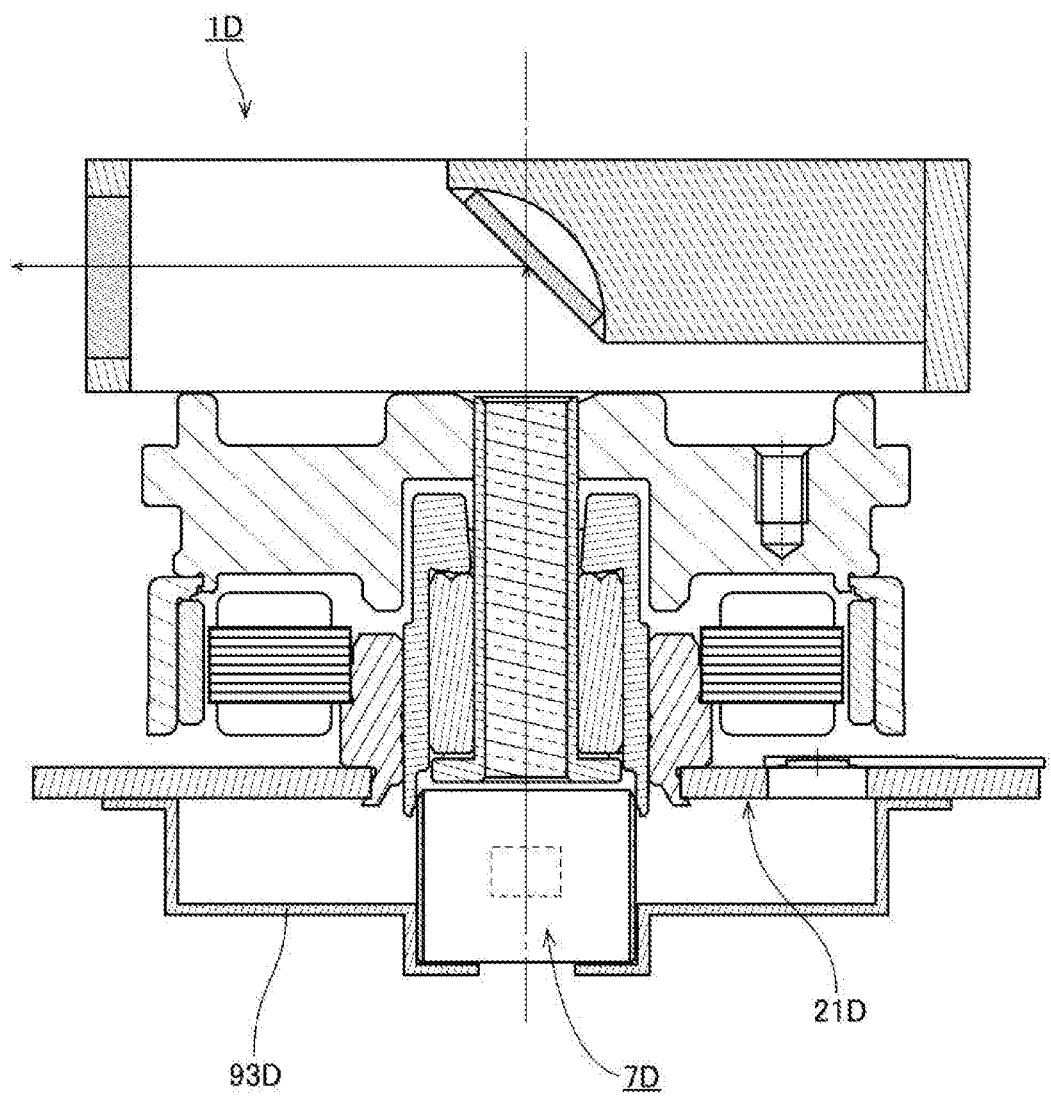
FIG. 8 is a vertical sectional view of a rotary drive apparatus according to a modification of the first preferred embodiment.

FIG. 8 is a vertical sectional view of a rotary drive apparatus 1D according to a modification of the first preferred embodiment. In the modification illustrated in FIG. 8, the rotary drive apparatus 1D includes a module holding cap 93D, which is provided separately from a base portion 21D, and which is arranged to cover at least a portion of at least one of a lower surface and a side surface of a laser module 7D. The module holding cap 93D is fixed to at least a portion of the base portion 21D through, for example, adhesion, press fitting, or screwing. The laser module 7D is thus securely held.

Figure 9:
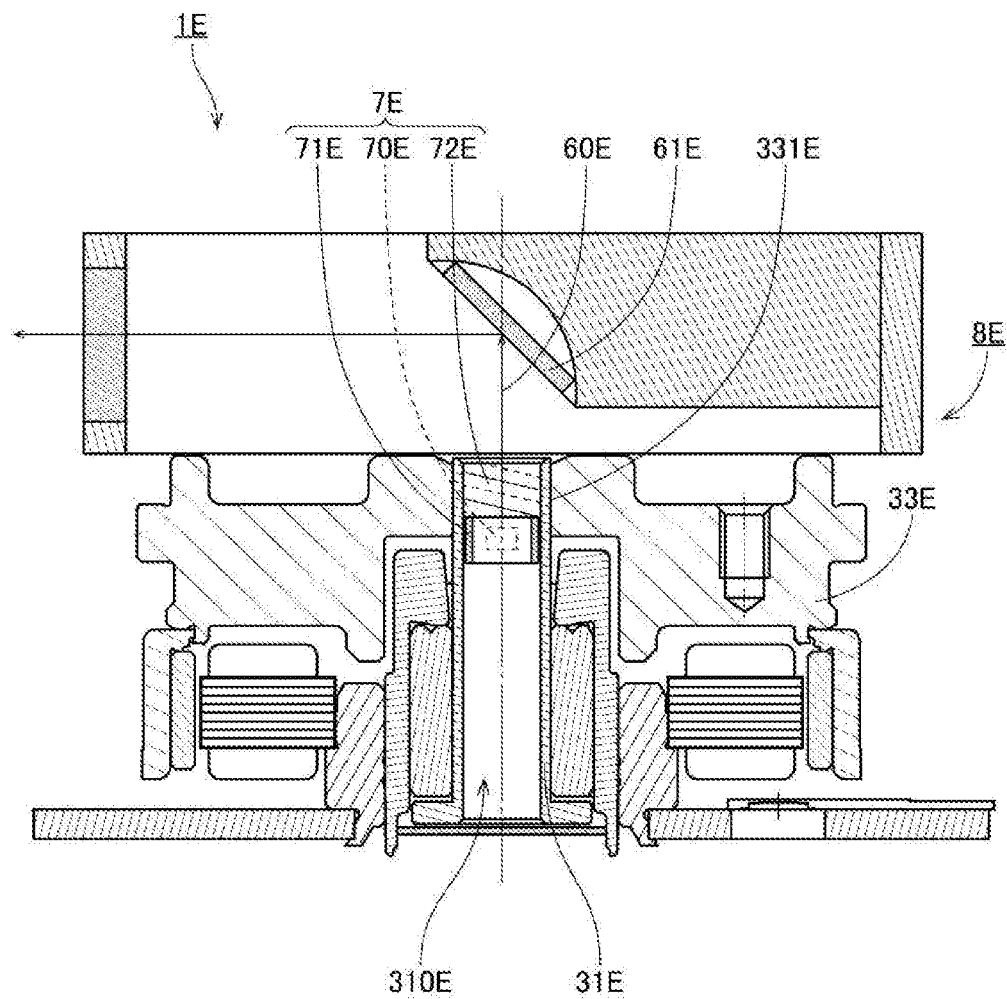
FIG. 9 is a vertical sectional view of a rotary drive apparatus according to a modification of the first preferred embodiment.

FIG. 9 is a vertical sectional view of a rotary drive apparatus 1E according to another modification of the first preferred embodiment. In the modification illustrated in FIG. 9, a laser module 7E includes a light source 70E and a light-transmitting member 72E. At least a portion of the laser module 7E is arranged in an upper portion of a through hole 310E of a hollow shaft 31E. In addition, the laser module 7E is arranged to overlap with a fixing portion 331E, which is arranged to fix an inner circumferential surface of a rotor hub portion 33E and an outer circumferential surface of an upper end portion of the hollow shaft 31E to each other, when viewed in a radial direction. In the rotary drive apparatus 1E, the light source 70E is arranged at a position close to a mirror 61E of a flywheel 8E, and this leads to increased accuracy in maintaining a direction in which incoming light 60E emitted from the light source 70E travels. Thus, a light beam can be emitted to an outside of the flywheel 8E with high accuracy.

Figure 10:
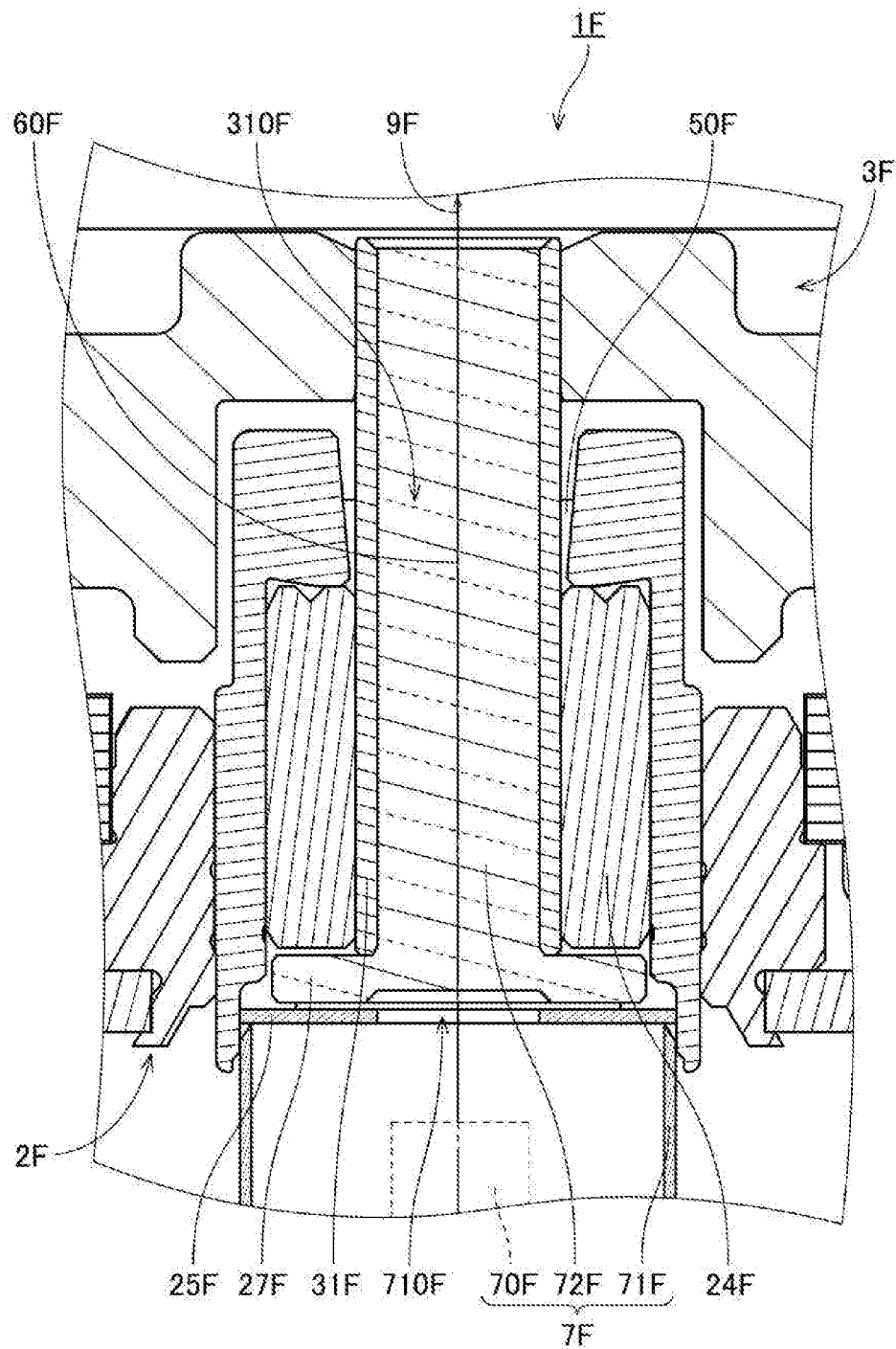
FIG. 10 is a partial vertical sectional view of a rotary drive apparatus according to a modification of the first preferred embodiment.

FIG. 10 is a partial vertical sectional view of a rotary drive apparatus 1F according to yet another modification of the first preferred embodiment. In the modification illustrated in FIG. 10, a rotating portion 3F includes a bushing 27F arranged to cover a lower surface of a sleeve portion 24F. In addition, a hollow shaft 31F is a cylindrical member arranged to extend in the axial direction along a central axis 9F radially inside of a stationary portion 2F. A through hole 310F passing through the hollow shaft 31F in the axial direction is defined around the central axis 9F radially inside of the hollow shaft 31F. In addition, a light-transmitting member 72F of a laser module 7F is arranged to be in contact with an inner circumferential surface of the hollow shaft 31F over the entire circumferential extent of the inner circumferential surface of the hollow shaft 31F, over at least a portion of the vertical extent of the through hole 310F. Further, in the present modification, the bushing 27F and at least a portion of the light-transmitting member 72F of the laser module 7F are defined by a single monolithic member. A disk-shaped cap 25F is arranged below the bushing 27F, and includes, in a center thereof, a through hole 710F arranged to allow incoming light 60F emitted from a light source 70F to pass therethrough. A lubricating oil 50F is arranged in a gap between a lower surface of the bushing 27F and an upper surface of the cap 25F, radially outside of the through hole 710F. Further, an upper surface of the light source 70F of the laser module 7F is arranged below the lower surface of the bushing 27F. This reduces the likelihood that the lubricating oil 50F will enter into the light source 70F of the laser module 7F. Note that the cap 25F may alternatively include a light-transmitting member in the place of the through hole 710F. In other words, the cap 25F may include no through hole. In this case, a so-called full-fill structure can be realized, with the lubricating oil 50F spreading over the entire upper surface of the cap 25F.

Figure 11:
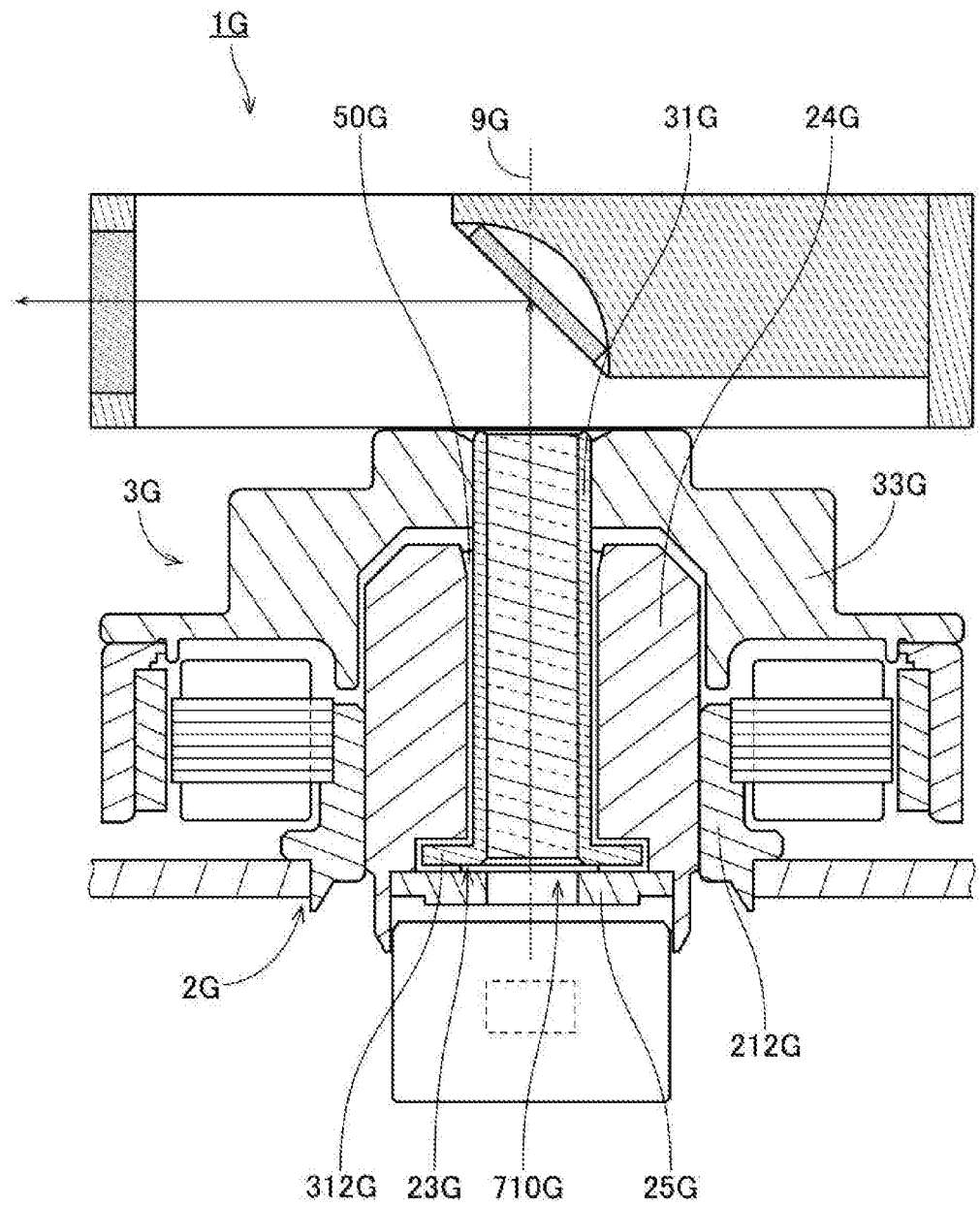
FIG. 11 is a vertical sectional view of a rotary drive apparatus according to a modification of the first preferred embodiment.

FIG. 11 is a vertical sectional view of a rotary drive apparatus 1G according to yet another modification of the first preferred embodiment. In the modification illustrated in FIG. 11, a bearing portion 23G includes a sleeve portion 24G arranged to extend in the axial direction to assume a cylindrical shape around a hollow shaft 31G, and a disk-shaped cap 25G arranged to close an opening at a lower end portion of the sleeve portion 24G. A lower portion of the sleeve portion 24G is inserted radially inside of a stator holder 212G, and is fixed to the stator holder 212G through, for example, an adhesive. A rotor hub portion 33G is fixed to an outer circumferential surface of an upper portion of the hollow shaft 31G, and is arranged to extend in an annular shape around the hollow shaft 31G. In addition, a lubricating oil 50G is arranged in a gap between a lower surface of a shaft annular portion 312G and an upper surface of the cap 25G, radially outside of a through hole 710G of the cap 25G.

A fluid dynamic bearing is defined by a combination of the sleeve portion 24G and the cap 25G, which belong to a stationary portion 2G, the hollow shaft 31G, which includes the shaft annular portion 312G and which belongs to a rotating portion 3G, and the lubricating oil 50G arranged therebetween. The rotating portion 3G is supported by the fluid dynamic bearing, and is arranged to rotate about a central axis 9G. Note that the cap 25G may alternatively include a light-transmitting member in the place of the through hole 710G. In other words, the cap 25G may include no through hole. In this case, a so-called full-fill structure can be realized, with the lubricating oil 50G spreading over the entire upper surface of the cap 25G.

In each of the above-described preferred embodiments, at least a portion of the light-transmitting member is arranged radially inside of the hollow shaft, and is fixed to the inner circumferential surface of the hollow shaft through, for example, adhesion. Note, however, that the laser module may alternatively have a gap where the light-transmitting member and the inner circumferential surface of the hollow shaft are arranged radially opposite to each other, and further include a sealing agent arranged in the gap. Note that the sealing agent may be an adhesive. Thus, the light-transmitting member and the inner circumferential surface of the hollow shaft will be more closely adhered to each other, and be securely fixed to each other.

Also note that at least a portion of the light-transmitting member may alternatively be fixed radially inside of the hollow shaft without use of an adhesive. For example, a thermally expandable material may be used as a material of the light-transmitting member, with the light-transmitting member being arranged to have an outside diameter smaller than an inside diameter of the hollow shaft. In this case, after the light-transmitting member is inserted into the hollow shaft, heat is applied to the light-transmitting member, so that the light-transmitting member expands and is closely adhered and fixed to an inner circumference of the hollow shaft.

The motor used in the rotary drive apparatus according to each of the above-described preferred embodiments is a so-called outer-rotor motor, in which a magnet is arranged radially outward of a stator. Note, however, that a so-called inner-rotor motor, in which a magnet is arranged radially inward of a stator, may be used in a rotary drive apparatus according to another preferred embodiment of the present invention.

Also note that, in another preferred embodiment of the present invention, a bearing having another structure, such as, for example, a ball bearing, may be used in place of or in addition to a fluid dynamic bearing as used in each of the above-described preferred embodiments.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, rotary drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary drive apparatus arranged to cause incoming light coming from a light source to be emitted to an outside while changing a direction of the incoming light, the rotary drive apparatus comprising:
    a motor including a hollow shaft arranged to extend along a central axis extending in a vertical direction, the hollow shaft including a through hole arranged to pass therethrough in an axial direction;
    a flywheel including at least one optical component arranged to reflect the incoming light or allow the incoming light to pass therethrough; and
    a laser module including the light source and a light-transmitting member; wherein
    the through hole defines a light path along which the incoming light travels; and
    the light-transmitting member is arranged to be in contact with an inner circumferential surface of the hollow shaft over an entire circumferential extent of the inner circumferential surface of the hollow shaft, over at least a portion of a vertical extent of the through hole.

2. The rotary drive apparatus according to claim 1, wherein the at least one optical component includes a mirror arranged to reflect the incoming light and change the direction of the incoming light.

3. The rotary drive apparatus according to claim 1, wherein the at least one optical component includes a lens arranged to allow the incoming light to pass therethrough after the direction of the incoming light is changed in the flywheel.

4. The rotary drive apparatus according to claim 1, wherein
    the motor includes:
        a stationary portion including a stator; and
        a rotating portion supported through a bearing portion to be rotatable about the central axis with respect to the stationary portion, the rotating portion including a magnet arranged opposite to the stator;
    the rotating portion further includes a rotor hub portion having the magnet directly or indirectly fixed thereto, and arranged to extend in an annular shape around the hollow shaft;
    the flywheel is supported by the rotating portion;
    the rotating portion further includes a fixing portion arranged to fix the rotor hub portion and the hollow shaft to each other; and
    at least a portion of the laser module is arranged to overlap with the fixing portion when viewed in a radial direction.

5. The rotary drive apparatus according to claim 1, wherein the laser module includes a portion arranged below a lower end portion of the hollow shaft, and arranged to contain the light source.

6. The rotary drive apparatus according to claim 1, wherein the light-transmitting member is made of a material containing glass, acrylic, or polycarbonate.

7. The rotary drive apparatus according to claim 1, wherein
- at least a portion of the light-transmitting member is arranged radially inside of the hollow shaft, and is arranged radially opposite to the inner circumferential surface of the hollow shaft with a gap therebetween; and
- the laser module further includes a sealing agent arranged in the gap.

8. The rotary drive apparatus according to claim 7, wherein the sealing agent is an adhesive.

9. The rotary drive apparatus according to claim 4, wherein
- the stationary portion includes a base portion arranged to directly or indirectly support the stator; and
- at least a portion of the laser module is arranged below the hollow shaft and radially inside of the base portion.

10. The rotary drive apparatus according to claim 4, wherein
the rotating portion further includes:
- an annular sleeve portion arranged to extend in the axial direction around the hollow shaft;
- a first cap arranged to extend radially inward from an upper end portion of the sleeve portion, and including an upper end portion arranged lower than an upper end portion of the hollow shaft; and
- a second cap arranged to extend radially inward from a lower end portion of the sleeve portion, and including a lower end portion arranged higher than a lower end portion of the hollow shaft;
- the stationary portion and the rotating portion are arranged opposite to each other with a gap therebetween, the gap having a lubricating oil arranged therein;
- at least one of the stationary portion and the rotating portion further includes a dynamic pressure groove defined in a portion thereof which defines a portion of the gap;
- an upper surface of the lubricating oil is arranged to overlap with the first cap when viewed in the radial direction;
- a lower surface of the lubricating oil is arranged to overlap with the second cap when viewed in the radial direction; and
- the sleeve portion includes a sleeve through hole arranged to pass through the sleeve portion in the radial direction below the first cap and above the second cap.

11. The rotary drive apparatus according to claim 9, wherein
the base portion includes:
- a cylindrical stator holder arranged to extend in the axial direction, and including an outer circumferential surface to which the stator is fixed; and
- a base body fixed to the stator holder, and arranged to extend radially outward therefrom;
the stator holder includes:
- a cylindrical holder body arranged to extend axially downward beyond the base body; and
- a plate-shaped module holding portion arranged to extend radially inward from the holder body; and
at least a portion of a lower surface of the laser module is covered with the module holding portion.

12. The rotary drive apparatus according to claim 4, wherein
the rotating portion further includes:
- an annular sleeve arranged to extend in the axial direction around the hollow shaft; and
- a bushing arranged to cover a lower surface of the sleeve portion; and
the bushing and at least a portion of the laser module are defined by a single monolithic member.

13. The rotary drive apparatus according to claim 9, further comprising a module holding cap arranged to cover at least a portion of at least one of a lower surface and a side surface of the laser module, wherein the module holding cap is fixed to the base portion.

14. The rotary drive apparatus according to claim 1, wherein
the motor includes:
- a stationary portion including a stator; and
- a rotating portion supported through a bearing portion to be rotatable about the central axis with respect to the stationary portion, the rotating portion including a magnet arranged opposite to the stator; and
the magnet is arranged radially outward of the stator.

15. The rotary drive apparatus according to claim 1, wherein
the motor includes:
- a stationary portion including a stator; and
- a rotating portion supported through a bearing portion to be rotatable about the central axis with respect to the stationary portion, the rotating portion including a magnet arranged opposite to the stator; and
the magnet is arranged radially inward of the stator.

* * * * *